US011654665B2

(12) United States Patent
Ahn et al.

(10) Patent No.: US 11,654,665 B2
(45) Date of Patent: May 23, 2023

(54) WINDOW COVER FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Jong Nam Ahn, Daejeon (KR); Keon Hyeok Ko, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

(21) Appl. No.: 17/034,505

(22) Filed: Sep. 28, 2020

(65) Prior Publication Data

US 2021/0094265 A1     Apr. 1, 2021

(30) Foreign Application Priority Data

Sep. 30, 2019   (KR) .................. 10-2019-0120532

(51) Int. Cl.
*B32B 27/28*     (2006.01)

(52) U.S. Cl.
CPC ........ *B32B 27/281* (2013.01); *B32B 2307/40* (2013.01); *B32B 2307/536* (2013.01); *B32B 2307/54* (2013.01); *B32B 2307/746* (2013.01); *B32B 2457/20* (2013.01); *Y10T 428/31721* (2015.04)

(58) Field of Classification Search
CPC .............. B32B 27/281; B32B 2307/40; B32B 2307/536; B32B 2307/54; B32B 2307/746; B32B 2457/20; B32B 27/08; Y10T 428/31721; G02B 1/14; G02B 1/04; G09F 9/301; C08J 7/046; C08J 7/042; C08J 2379/08; C08J 2433/04; C08J 2475/14; C08J 2483/06; C08K 3/36; C09D 5/1662; C09D 5/1668
See application file for complete search history.

(56) References Cited

U.S. PATENT DOCUMENTS

| | | | |
|---|---|---|---|
| 9,706,649 B2 | 7/2017 | Jung et al. | |
| 10,815,378 B2 | 10/2020 | Kim et al. | |
| 2016/0185926 A1* | 6/2016 | Song .................. | C08J 7/0427 |
| | | | 428/447 |
| 2017/0101540 A1* | 4/2017 | Tiang .................. | C09D 5/00 |
| 2017/0156227 A1 | 6/2017 | Heo et al. | |
| 2017/0342224 A1* | 11/2017 | Chae .................. | G09F 9/301 |

(Continued)

FOREIGN PATENT DOCUMENTS

| | | | |
|---|---|---|---|
| CN | 101701129 A | * | 5/2010 |
| JP | 04299139 A | * | 10/1992 |

(Continued)

OTHER PUBLICATIONS

Machine translation of JP 2001-188102. (Year: 2001).*

(Continued)

*Primary Examiner* — John D Freeman
(74) *Attorney, Agent, or Firm* — The Webb Law Firm

(57) ABSTRACT

The present invention relates to a window cover film and a flexible display panel including the same. More particularly, the present invention relates to a window cover film including a base layer, a hard coating layer, and an anti-fingerprint layer, and a flexible display panel including the same.

14 Claims, 1 Drawing Sheet

(56) References Cited

U.S. PATENT DOCUMENTS

| | | |
|---|---|---|
| 2018/0346751 A1 | 12/2018 | Kim et al. |
| 2019/0033494 A1 | 1/2019 | Kim et al. |
| 2019/0077960 A1 | 3/2019 | Kim et al. |
| 2020/0061967 A1 | 2/2020 | Cho et al. |
| 2020/0216614 A1 | 7/2020 | Auman et al. |
| 2020/0337969 A1 | 10/2020 | Lee et al. |

FOREIGN PATENT DOCUMENTS

| | | | |
|---|---|---|---|
| JP | 2001188102 A | | 7/2001 |
| JP | 2015203807 A | * | 11/2015 |
| JP | 2018118438 A | | 8/2018 |
| JP | 2019059210 A | | 4/2019 |
| JP | 2019513887 A | | 5/2019 |
| KR | 1020130074167 A | | 7/2013 |
| KR | 1020160114339 A | | 10/2016 |
| KR | 1020170028084 A | | 3/2017 |
| KR | 1020170064103 A | | 6/2017 |
| KR | 101927271 B1 | | 12/2018 |
| KR | 1020190012847 A | | 2/2019 |
| KR | 1020190029110 A | | 3/2019 |
| KR | 1020200016797 A | | 2/2020 |
| KR | 102147367 A | | 8/2020 |
| WO | 2019060169 A1 | | 3/2019 |

OTHER PUBLICATIONS

Machine translation of JP 2015-203807. (Year: 2015).*
Machine translation of CN 101701129. (Year: 2010).*
Machine translation of JP H04-299139. (Year: 1992).*

* cited by examiner

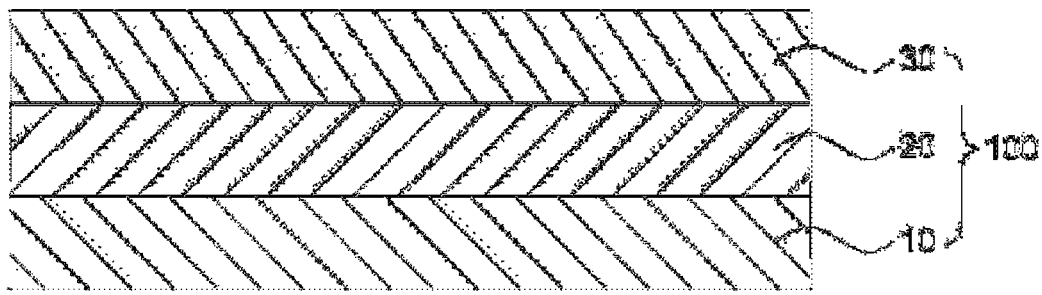

WINDOW COVER FILM AND FLEXIBLE DISPLAY PANEL INCLUDING THE SAME

CROSS-REFERENCE TO RELATED APPLICATION

This application claims priority to Korean Patent Application No. 10-2019-0120532 filed Sep. 30, 2019, the disclosure of which is hereby incorporated by reference in its entirety.

TECHNICAL FIELD

The following disclosure relates to a window cover film and a flexible display panel including the same.

BACKGROUND

A thin type display device such as a liquid crystal display device or an organic light emitting diode display device is implemented in a touch screen panel type, and has been widely used in various smart devices having portability such as a smart phone, a tablet PC, and various wearable devices.

Such a portable touch screen panel-based display device is provided with a display protective window cover on a display panel for protecting the display panel from scratches or external impact. In most cases, tempered glass for a display device has been used as the window cover. The tempered glass for a display device is thinner than general glass, but is resistant to scratches due to its high strength.

However, since the tempered glass is not suitable for a lightweight portable device due to its heavy weight, and is breakable due to its vulnerability to external impact, the tempered glass is only bent to a limited degree, and thus is not suitable as a material for a flexible display device which is bendable and foldable.

Recently, various studies on an optical plastic cover ensuring flexibility and impact resistance, and having strength or scratch resistance corresponding to those of tempered glass have been conducted. In general, examples of a material for an optically clear plastic cover which is more flexible than the tempered glass include polyethylene terephthalate (PET), polyethersulfone (PES), polyethylene naphthalate (PEN), polyacrylate (PAR), polycarbonate (PC), polyimide (PI), polyamid (PA), and polyamide-imide (PAI). However, these polymer plastic substrates exhibit insufficient physical properties of hardness and scratch resistance as compared to the tempered glass used as a window cover for protecting a display device, and also have insufficient impact resistance. Accordingly, many attempts to complement these insufficient physical properties of these plastic substrates by coating these plastic substrates with a composite resin composition have been in progress.

In a case of a general hard coating, it is difficult to implement high hardness corresponding to that of the tempered glass, a curling phenomenon occurs a lot due to shrinkage at the time of curing, and also flexibility is insufficient. Thus, the tempered glass is not suitable as a protective window substrate to be applied to a flexible display device.

In addition, in order to be used as the clear plastic cover, it is required for the composite resin composition to have external impact resistance, an anti-fingerprint (AF) property that prevents the user's fingerprint marks from being left, the same touch feeling as that of glass together with the anti-fingerprint property, and a slip property, but a composition having sufficient physical properties has not been developed.

RELATED ART DOCUMENT

Patent Document (Patent Document 1) Korean Patent Laid-Open Publication No. 10-2013-0074167 (Jul. 4, 2013)

SUMMARY

An embodiment of the present invention is directed to providing a window cover film having the same touch feeling as that of glass and an excellent slip property.

Another embodiment of the present invention is directed to providing a window cover film having the same touch feeling as that of glass together with an anti-fingerprint (AF) property that prevents the user's fingerprint marks from being left.

Still another embodiment of the present invention is directed to providing a window cover film having excellent mechanical properties, abrasion resistance, an antifouling property, and a curl suppression property.

Still another embodiment of the present invention is directed to providing a flexible display panel having the same touch feeling as that of glass together with an anti-fingerprint (AF) property and an excellent slip property.

In one general aspect, there is provided a window cover film in which a dynamic friction coefficient b measured at a load of 200 g, a force of 5 N, and a rate of 100 mm/min using a parchment paper as an object to be rubbed is less than 0.15, and a ratio of a static friction coefficient a to the dynamic friction coefficient b satisfies the following Expression 1.

$$0.5 \leq a/b \leq 1.5 \qquad \text{[Expression 1]}$$

The window cover film may have a static friction coefficient of 0.2 or less.

The window cover film may have a dynamic friction coefficient of 0.1 or less.

The window cover film may include a base layer, a hard coating layer formed on at least one surface of the base layer, and an anti-fingerprint layer formed on the hard coating layer.

The anti-fingerprint layer may have a water contact angle of 105° or more.

The anti-fingerprint layer may have a sliding angle of 35° or less.

The anti-fingerprint layer may be derived from a polyfunctional (meth)acrylate polymer, a polyfunctional urethane (meth)acrylate oligomer having 6 to 15 (meth)acrylic groups as a functional group, a polyfunctional (meth)acrylate monomer having 2 to 6 (meth)acrylic groups, and a fluorinated (meth)acrylate monomer.

A weight average molecular weight of the fluorinated (meth)acrylate monomer may be 1,500 to 5,000 g/mol.

The anti-fingerprint layer may further include inorganic particles.

An average particle diameter of the inorganic particles may be 50 nm or less.

The inorganic particle may be one or a mixture selected from silica and alumina.

The base layer may have a modulus measured according to ASTM D882 of 3 GPa or more, a break elongation measured according to ASTM D882 of 8% or more, a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

The base layer may be formed of a polyamide-imide (PAI)-based resin.

The base layer may include a unit derived from fluorine-based aromatic diamine, a unit derived from aromatic dianhydride, a unit derived from alicyclic dianhydride, and a unit derived from aromatic diacid dichloride.

A thickness of the base layer may be 10 to 500 μm, a thickness of the hard coating layer may be 1 to 50 μm, and a thickness of the anti-fingerprint layer may be 0.01 to 10 μm.

A pencil hardness of the hard coating layer may be 4 H or higher.

In another general aspect, there is provided a flexible display panel including the window cover film.

Other features and aspects will be apparent from the following detailed description, the drawings, and the claims.

BRIEF DESCRIPTION OF THE DRAWINGS

FIG. 1 is a schematic view illustrating a cross section of a window cover film according to an exemplary embodiment of the present invention.

DETAILED DESCRIPTION OF MAIN ELEMENTS

10: Base layer
20: Hard coating layer
30: Anti-fingerprint layer
100: Window cover film

DETAILED DESCRIPTION OF EMBODIMENTS

Hereinafter, the present invention will be described in detail through specific exemplary embodiments or exemplary embodiments. However, the following specific exemplary embodiments or exemplary embodiments are only one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention belongs. The terms used in the description of the present invention are only to effectively describe a specific exemplary embodiment, and are not to limit the present invention.

In addition, unless the context clearly indicates otherwise, singular forms used in the specification and the appended claims may be intended to include plural forms.

Unless explicitly described to the contrary, "comprising" any components will be understood to imply further inclusion of other components rather than the exclusion of any other components.

The term "polyimide-based resin" in the present invention is used as the term including polyimide or polyamide-imide. The term "polyimide-based film" is also the same as described above.

The term "film" in the present invention may be a film obtained by applying a "polyimide-based resin solution" onto a base material, and drying and peeling the polyimide-based resin solution, and may be stretched or not stretched.

The terms "curl" and "curling" in the present invention refer to bending-deformation of the film. The term "degree of curl" may refer to a vertical height from the lowest point of the film to a point where the film is bent and raised when a curled film is disposed on a plane of the film.

The term "curl suppression property" used in the specification may refer to a property in which the "degree of curl" is small.

The term "dynamic bending properties" in the present invention may refer to that permanent deformation and/or damage does not occur at a deformed portion (for example, folded portion) even though the window cover film is repeatedly deformed (for example, folding and unfolding).

Hereinafter, the present invention will be described. As a result of conducting intensive studies to solve the above problems, the inventors of the present invention found that within a specific range of a ratio of a static friction coefficient to a dynamic friction coefficient, a window cover film having the same touch feeling as that of glass together with an anti-fingerprint property, and an excellent slip property may be provided, thereby completing the present invention. Specifically, the inventors of the present invention found that in a case where a dynamic friction coefficient b measured at a load of 200 g, a force of 5 N, and a rate of 100 mm/min using a parchment paper as an object to be rubbed is less than 0.15, and a ratio of a static friction coefficient a to the dynamic friction coefficient b is $0.5 \le a/b \le 1.5$, a window cover film having the same touch feeling as that of glass and an excellent slip property may be provided, thereby completing the present invention.

In addition, the inventors of the present invention found that a hard coating layer having a specific composition and an anti-fingerprint layer having a specific composition formed on the hard coating layer are formed, such that a window cover film having an excellent antifouling property and abrasion resistance, an anti-fingerprint (AF) property, the same touch feeling as that of glass together with the anti-fingerprint property, an excellent slip property, high surface hardness, flexibility, and excellent bending properties may be provided, thereby completing the present invention.

In addition, in the present invention, in a case where a polyamide-imide-based polymer having a fluorine-substituted polyamide block and an alicyclic structure is applied, the window cover film has a more excellent touch feeling and an excellent flexibility and optical properties, which is more preferable.

Hereinafter, the present invention will be described in more detail with reference to the drawing. However, this is only illustrative, and the present invention is not limited to specific exemplary embodiments which are illustratively described by the present invention.

FIG. 1 is a schematic view illustrating a window cover film according to exemplary embodiments of the present invention.

Referring to FIG. 1, a window cover film 100 includes a base layer 10, a hard coating layer 20, and an anti-fingerprint layer 30.

It is preferable that the base layer 10, the hard coating layer 20, and the anti-fingerprint layer 30 are sequentially stacked. In addition, the respective layers may be stacked in direct contact with each other or with another layer therebetween.

The window cover film according to an exemplary embodiment of the present invention has mechanical properties and dynamic bending properties that are significantly improved by chemical bonding between the base layer and the hard coating layer.

Specifically, the excellent and improved dynamic bending properties mean that the window cover film is not deformed and cracks in the window cover film do not occur even though the window cover film is repeatedly deformed, specifically, folded and unfolded. More specifically, the cracks may not occur, even though a bending operation is repeated 30,000 times or more, preferably 100,000 times or more, and more preferably 200,000 times or more, when measuring the dynamic bending properties. The term "crack" may refer to a "fine crack". The term "fine crack" used in the specification may refer to a crack having a size that is not normally observed with the naked eye. The fine crack may refer to, for example, a crack having a width of 0.5 μm or more and a length of 10 μm or more, and may be observed with a microscope.

In addition, uniform physical properties may be exhibited over the entire area of the window cover film due to uniform physical properties between the anti-fingerprint layer formed on the hard coating layer and the hard coating layer. The same durability and touch feeling as those of glass may be imparted to the window cover film.

Specifically, a dynamic friction coefficient b measured at a load of 200 g, a force of 5 N, and a rate of 100 mm/min using a parchment paper as an object to be rubbed against the anti-fingerprint layer may be less than 0.15, and a ratio of a static friction coefficient a to the dynamic friction coefficient b may satisfy the following Expression 1. In this case, the dynamic friction coefficient and the static friction coefficient are measured according to ASTM D1894 using a Friction Tester (TR-2, Toyo Seiki Seisaku-sho, Ltd.).

$$0.5 \le a/b \le 1.5 \quad \text{[Expression 1]}$$

More specifically, the ratio (a/b) of the static friction coefficient a to the dynamic friction coefficient b may be 0.6 to 1.4, preferably 0.8 to 1.3, and more preferably 0.9 to 1.2. Within the above ranges, the same durability and surface strength as those of glass may be provided, and it is possible to allow a user to feel the same feeling of actually touching glass.

Hereinafter, configurations of the respective layers of the present invention will be described in detail.

<Base Layer>

The base layer has excellent optical properties and mechanical properties, and may be formed of a material having an elastic force and a restoring force. In an exemplary embodiment of the present invention, a thickness of the base layer may be 10 to 500 μm, 20 to 250 μm, or 30 to 100 μm.

In an exemplary embodiment of the present invention, the base layer may have a modulus measured according to ASTM D882 of 3 GPa or more, 4 GPa or more, or 5 GPa or more, a break elongation measured according to ASTM D882 of 8% or more, 12% or more, or 15% or more, a light transmittance measured at 388 nm according to ASTM D1746 of 5% or more or 5 to 80%, a total light transmittance measured at 400 to 700 nm according to ASTM D1746 of 87% or more, 88% or more, or 89% or more, a haze measured according to ASTM D1003 of 2.0% or less, 1.5% or less, or 1.0% or less, a yellow index measured according to ASTM E313 of 5.0 or less, 3.0 or less, or 0.4 to 3.0, and a value measured according to ASTM E313 of 2.0 or less, 1.3 or less, or 0.4 to 1.3.

In an exemplary embodiment of the present invention, the base layer is formed of a polyimide-based resin, in particular, a polyimide-based resin having a polyamide-imide structure.

In addition, the base layer may be more preferably formed of a polyamide-imide-based resin having a fluorine atom and an aliphatic cyclic structure, and thus, the base layer may have excellent mechanical properties and dynamic bending properties.

As a more specific example, the base layer may include a polyamide-imide-based resin derived from fluorine-based aromatic diamine, aromatic dianhydride, alicyclic dianhydride, and aromatic diacid dichloride.

In an exemplary embodiment of the present invention, as an example of the polyamide-imide-based resin having the fluorine atom and the aliphatic cyclic structure, in a case where an amine-terminated polyamide oligomer derived from first fluorine-based aromatic diamine and aromatic diacid dichloride is produced, and a polyamide-imide polymer is produced by polymerizing and imidizing the amine-terminated polyamide oligomer and monomers derived from second fluorine-based aromatic diamine, aromatic dianhydride, and alicyclic dianhydride, the object of the present invention is better achieved, which is most preferable. The first fluorine-based aromatic diamine and the second fluorine-based aromatic diamine may be of the same or different types.

As described above, in the base layer according to an exemplary embodiment of the present invention, in a case where an amine-terminated oligomer in which an amide structure is formed in a polymer chain by aromatic diacid dichloride is included in a diamine monomer, the optical properties, and in particular, mechanical strength such as a modulus may be improved, and the dynamic bending properties may be further improved.

In an exemplary embodiment of the present invention, when the resin has a fluorine-substituted polyamide oligomer block as described above, a molar ratio of the diamine monomer including the amine-terminated fluorine-substituted polyamide oligomer and the second fluorine-based aromatic diamine to the dianhydride monomer including the aromatic dianhydride and the alicyclic dianhydride of the present invention is preferably 1:0.9 to 1.1, and more preferably 1:1. In addition, a content of the amine-terminated polyamide oligomer with respect to a total content of the diamine monomer is not particularly limited, but is 30 mol % or more, preferably 50 mol % or more, and more preferably 70 mol % or more, in terms of achieving the mechanical properties, the yellow index, and the optical properties of the present invention. In addition, when a polyamide-imide film having a difference in surface energy according to the present invention is provided, selectivity of a coating solvent may be increased by a variety of solubilities. In addition, a composition ratio of the aromatic dianhydride to the alicyclic dianhydride is not particularly limited, and is preferably 30 to 80 mol %:70 to 20 mol %, in consideration of achieving the transparency, the yellow index, and the mechanical properties of the present invention, but the present invention is not limited thereto.

In addition, as another example, the polyamide-imide-based resin including the fluorine atom and the aliphatic cyclic structure may be a polyamide-imide-based resin obtained by mixing, polymerizing, and imidizing fluorine-based aromatic diamine, aromatic dianhydride, alicyclic dianhydride, and aromatic diacid dichloride. Such a resin has a random copolymer structure. A content of the aromatic diacid dichloride may be 40 moles or more, preferably 50 to 80 moles, with respect to 100 moles of diamine. A content of the aromatic dianhydride may be 10 to 50 moles with respect to 100 moles of the diamine. A content of the alicyclic dianhydride may be 10 to 60 moles with respect to 100 moles of the diamine. The polyamide-imide-based resin may be prepared by polymerizing diacid dichloride and dianhydride with respect to the diamine monomer at a molar ratio of 1:0.9 to 1.1, and more preferably 1:1. A random polyamide-imide of the present invention is different in the optical properties such as transparency, the mechanical properties, and the solvent sensitivity due to a difference in surface energy from the block polyamide-imide resin, but may also fall within the scope of the present invention.

In an exemplary embodiment of the present invention, a mixture of 2,2'-bis(trifluoromethyl)-benzidine and another known aromatic diamine may be used as the fluorine-based aromatic diamine, but 2,2'-bis(trifluoromethyl)-benzidine may be used alone. By using such a fluorine-based aromatic diamine, the optical properties and the yellow index of the polyamide-imide-based film may be improved. In addition, a tensile modulus of the polyamide-imide-based film may be improved, and thus mechanical strength of the window cover film may be improved and dynamic bending properties may be further improved.

The aromatic dianhydride may be one or a mixture of two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In an exemplary embodiment of the present invention, in the case where the amide structure is formed in the polymer chain by the aromatic diacid dichloride, the optical properties, and in particular, the mechanical strength such as a modulus, may be greatly improved, and the dynamic bending properties may be further improved.

The aromatic diacid dichloride may be a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

In the present invention, a weight average molecular weight of the polyimide resin is not particularly limited, but may be 200,000 g/mol or more, preferably 300,000 g/mol or more, and more preferably 200,000 to 500,000 g/mol. In addition, a glass transition temperature of the polyimide resin is not limited, but may be 300 to 400° C., and more specifically, 330 to 380° C. Within the above ranges, a film having a high modulus, excellent mechanical strength, excellent optical properties, and less curl may be provided, which is preferable, but the present invention is not particularly limited thereto.

Hereinafter, a method of producing the base layer will be described.

In an exemplary embodiment of the present invention, the base layer may be produced by applying a "polyimide-based resin solution" including a polyimide-based resin and a solvent onto a base material, and drying or drying and stretching the base material. That is, the base layer may be produced by a solution casting method.

As an example, the base layer may be produced by a method including a step of producing an oligomer by reacting fluorine-based aromatic diamine with aromatic diacid dichloride, a step of producing a polyamic acid solution by reacting the produced oligomer, fluorine-based aromatic diamine, aromatic dianhydride, and alicyclic dianhydride with each other, a step of preparing a polyamide-imide resin by imidizing the polyamic acid solution, and a step of forming a film by applying a polyamide-imide solution obtained by dissolving the polyamide-imide resin in an organic solvent.

Hereinafter, the respective steps will be described in more detail by using a case in which a block polyamide-imide film is produced, as an example.

The step of producing the oligomer may include a step of reacting fluorine-based aromatic diamine with aromatic diacid dichloride in a reactor and a step of purifying and drying the obtained oligomer. In this case, the fluorine-based aromatic diamine may be introduced at a molar ratio of 1.01 to 2 relative to the aromatic diacid dichloride to produce an amine-terminated polyamide oligomer monomer. A molecular weight of the oligomer monomer is not particularly limited, but, for example, when a weight average molecular weight thereof is within a range of 1,000 to 3,000 g/mol, the film may have more excellent physical properties.

In addition, an aromatic carbonyl halide monomer such as terephthaloyl chloride or isophthaloyl chloride rather than terephthalic acid ester or terephthalic acid itself is preferably used to introduce an amide structure, which seems to affect the physical properties of the film by a chloride element, although the reason is not clear.

Next, the step of producing the polyamic acid solution may be performed by a solution polymerization reaction in which the produced oligomer, fluorine-based aromatic diamine, aromatic dianhydride, and alicyclic dianhydride are reacted with each other in an organic solvent. For example, the organic solvent used for the polymerization reaction in this case may be one or two or more polar solvents selected from the group of consisting of dimethylacetamide (DMAc), N-methyl-2-pyrrolidone (NMP), dimethylformamide (DMF), dimethylsulfoxide (DMSO), ethyl cellosolve, methyl cellosolve, acetone, ethylacetate, and m-cresol.

Next, the step of preparing the polyamide-imide resin by imidizing the polyamic acid solution may be performed through chemical imidization. More preferably, the polyamic acid solution is chemically imidized using pyridine and acetic anhydride. Subsequently, the polyamic acid solution may be imidized using an imidization catalyst and a dehydrating agent at a low temperature of 150° C. or lower, preferably 100° C. or lower, and specifically, 50 to 150° C.

In the case where the polyamic acid solution is imidized by such a method, mechanical properties may be uniformly imparted to the entire film as compared to a case where the polyamic acid solution is imidized by heat at a high temperature.

One or two or more selected from pyridine, isoquinoline, and β-quinoline may be used as the imidization catalyst. In addition, one or two or more selected from acetic anhydride, phthalic anhydride, and maleic anhydride may be used as the dehydrating agent, but the present invention is not limited thereto.

In addition, the polyamide-imide resin may be prepared by mixing the polyamic acid solution with an additive such as a retardant, an adhesive enhancer, an inorganic particle, an antioxidant, an ultraviolet stabilizer, or a plasticizer.

In addition, after the imidization is performed, the resin may be purified using the solvent to obtain a solid content, and the solid content may be dissolved in a solvent, thereby obtaining a polyamide-imide solution. The solvent may include, for example, N,N-dimethylacetamide (DMAc) and the like, but the present invention is not limited thereto.

The step of forming the film of the polyamide-imide solution is performed by applying the polyamide-imide solution onto a base material and drying the polyamide-imide solution in a drying step divided into a drying region. In addition, a stretching step may be performed before or after the drying step, or a heat treatment step may be further performed after the drying or stretching step, if necessary. For example, glass, stainless steel, or a film may be used as the base material, but the present invention is not limited thereto. The application may be performed by a die coater, an air knife, a reverse roll, a spray, a blade, casting, gravure, spin coating, or the like.

<Hard Coating Layer>

The hard coating layer according to the present exemplary embodiment is formed to protect the base layer having the excellent optical properties and mechanical properties from external physical and chemical damage.

In an exemplary embodiment of the present invention, the hard coating layer may have a thickness of 1 to 50% of the entire thickness of the window cover film. Specifically, the hard coating layer may maintain optical properties while having excellent hardness. The thickness of the hard coating layer may be 1 to 50 μm, and more preferably, 1 to 30 μm. When the thickness of the hard coating layer is within the above ranges, the hard coating layer may maintain flexibility while having the excellent hardness, such that curl may not substantially occur.

In addition, a pencil hardness of the hard coating layer may be 2 H or higher, 3 H or higher, or 4 H or higher. When a scratch test is performed using steel wool (#0000, Liberon Limited), scratches are not generated at 10 times/1 Kgf, 20 times/1 Kgf, or 30 times/1 Kgf. A water contact angle of the hard coating layer may be 80° or more, 90° or more, or 100° or more.

In the present exemplary embodiment, the hard coating layer includes a silsesquioxane-based compound as a main component. More specifically, the silsesquioxane-based compound may be an alicyclic epoxidized silsesquioxane-based compound.

In this case, a weight average molecular weight of the silsesquioxane-based compound may be 1,000 to 20,000 g/mol. When the weight average molecular weight of the silsesquioxane-based compound is within the above range, the composition for forming a hard coating layer may have an appropriate viscosity. Therefore, flowability, coatability, and curing reactivity of the composition for forming a hard coating layer may be improved. In addition, the hardness of the hard coating layer may be improved. In addition, flexibility of the hard coating layer is improved, such that an occurrence of curl may be prevented. Preferably, the weight average molecular weight of the silsesquioxane-based compound may be 1,000 to 18,000 g/mol, and more preferably, 2,000 to 15,000 g/mol. The weight average molecular weight is measured using gel permeation chromatography (GPC).

The silsesquioxane-based compound includes, for example, a trialkoxysilane compound-derived repeating unit represented by the following Formula 1.

  [Formula 1]

wherein A represents C1-C10 linear or branched alkyl group in which a C3-C7 alicyclic alkyl group is substituted with epoxy, and R is independently a C1-C3 alkyl group.

Here, the alkoxysilane compound may be one or more selected from 2-(3,4-epoxycyclohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in an exemplary embodiment of the present invention, the silsesquioxane-based compound may include a trialkoxysilane compound-derived repeating unit represented by Formula 1 and a dialkoxysilane compound-derived repeating unit represented by the following Formula 2. In this case, the silsesquioxane-based compound may be prepared by mixing 0.1 to 100 parts by weight of the dialkoxysilane compound with respect to 100 parts by weight of the trialkoxysilane compound and performing condensation polymerization of the mixture. In this case, surface hardness is increased and the bending properties are significantly improved. It is considered that the bending properties are more efficiently exhibited by the alicyclic alkyl group substituted with epoxy in Formula 1, and the effect thereof is more increased as compared to a case where an alicyclic group is absent.

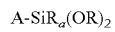  [Formula 2]

wherein $R_a$ is a linear or branched alkyl group selected from C1 to C5, and A and R are as defined in Formula 1.

Specific examples of the compound of Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, and 2-(3,4-epoxycyclopentyl)ethylmethyldiethoxysilane, but the present invention is not limited thereto. These compounds may be used alone or as a mixture of two or more thereof.

In addition, in an exemplary embodiment of the present invention, the hard coating layer may include an inorganic filler. For example, metal oxide such as silica, alumina, or titanium oxide; hydroxide such as aluminum hydroxide, magnesium hydroxide, or potassium hydroxide; a metal particle such as gold, silver, copper, nickel, or alloys thereof; a conductive particle such as carbon, carbon nanotube, or fullerene; glass; or ceramic may be used as the inorganic filler. Preferably, silica may be used in terms of compatibility of the composition with another component. These inorganic fillers may be used alone or as a mixture of two or more thereof.

In addition, the hard coating layer may further include a slip agent. The slip agent may improve winding efficiency, blocking resistance, abrasion resistance, scratch resistance, or the like. For example, waxes such as polyethylene wax, paraffin wax, synthetic wax, and montan wax; and synthetic resins such as a silicone-based resin and a fluorine-based resin may be used as the slip agent. These slip agents may be used alone or as a mixture of two or more thereof.

Hereinafter, a method of forming the hard coating layer will be described in detail.

The hard coating layer is formed by preparing a composition for forming a hard coating layer, and applying and curing the composition onto a base layer.

In an exemplary embodiment of the present invention, the composition for forming a hard coating layer includes silsesquioxane, a cross-linking agent, and a photoinitiator.

In addition, the composition for forming a hard coating layer may further include an epoxy-based monomer, a photoinitiator and/or a thermal initiator, a solvent, a thermosetting agent, an inorganic filler, a slip agent, an antioxidant, a UV absorber, a light stabilizer, a thermal polymerization inhibitor, a leveling agent, a surfactant, a lubricant, or an antifoulant.

The cross-linking agent may form a cross-linking bond with an epoxy siloxane-based resin to solidify the composition for forming a hard coating layer, such that the hardness of the hard coating layer may be increased.

For example, the cross-linking agent may contain a compound represented by the following Formula 3. The cross-linking agent which is an alicyclic epoxy compound having the same epoxy unit as those in structures of Formula 1 and Formula 2 promotes cross-linking bonding and allows the hard coating layer to maintain a refractive index, such that a viewing angle may not be changed, the bending properties may be maintained, and transparency of the hard coating layer may not be damaged, which is preferable.

[Formula 3]

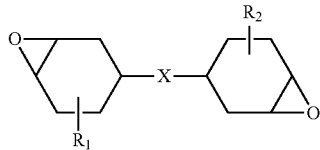

wherein $R_1$ and $R_2$ each independently may represent hydrogen or a linear or branched alkyl group having 1 to 5 carbon atoms, and X may be a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

Here, the "direct bond" refers to a structure which is directly bonded without other functional groups. For example, in Formula 3, the direct bond may refer to two cyclohexanes directly connected to each other. In addition, the "connecting group" refers to two or more above-described substituents connected to each other. In addition, in Formula 3, substitution positions of $R_1$ and $R_2$ are not particularly limited, but when the carbon connected to X is set at position 1, and the carbons connected to an epoxy group are set at positions 3 and 4, it is preferable that $R_1$ and $R_2$ are substituted at position 6.

A content of the cross-linking agent is not particularly limited, and for example, may be 1 to 150 parts by weight with respect to 100 parts by weight of the epoxy siloxane resin. When the content of the cross-linking agent is within the above range, the viscosity of the composition may be maintained in an appropriate range, and coatability and curing reactivity may be improved.

In addition, in an exemplary embodiment of the present invention, various epoxy compounds may be added to the hard coating layer in addition to the above-described compounds of the formulas, as long as the characteristics of the present invention are achieved, but a content thereof is preferably less than 20 parts by weight with respect to 100 parts by weight of the compound of Formula 2.

In an exemplary embodiment of the present invention, the epoxy-based monomer may be included in an amount of 10 to 80 parts by weight with respect to 100 parts by weight of the composition for forming a hard coating layer. Within the above content range, the viscosity may be adjusted, the thickness may be easily adjusted, a surface may be uniform, a defect in a thin film does not occur, and the hardness is sufficiently achieved, but the present invention is not limited thereto.

In an exemplary embodiment of the present invention, the photoinitiator is a photo-cationic initiator. The photo-cationic initiator may initiate condensation of the epoxy-based monomer including the above-described compounds. As the photo-cationic initiator, for example, an onium salt and/or an organic metal salt may be used, but the present invention is not limited thereto. For example, a diaryliodonium salt, a triarylsulfonium salt, an aryldiazonium salt, an iron-arene complex, or the like may be used. These photo-cationic initiators may be used alone or as a mixture of two or more thereof.

A content of the photoinitiator is not particularly limited, and for example, may be 0.1 to 10 parts by weight, and more preferably 0.2 to 5 parts by weight with respect to 100 parts by weight of the compound of Formula 1.

In an exemplary embodiment of the present invention, non-limiting examples of the solvent may include alcohols such as methanol, ethanol, isopropanol, butanol, methyl cellosolve, and ethyl cellosolve; ketones such as methyl ethyl ketone, methyl butyl ketone, methyl isobutyl ketone, diethyl ketone, dipropyl ketone, and cyclohexanone; alkanes such as hexane, heptane, and octane; and benzenes such as benzene, toluene, and xylene. These solvents may be used alone or as a mixture of two or more thereof.

In an exemplary embodiment of the present invention, the solvent may be included in a residual amount excluding the amount of the remaining components in a total weight of the composition.

As an exemplary embodiment, the composition for forming a hard coating layer may further include a thermosetting agent. Examples of the thermosetting agent may include a sulfonium salt-based thermosetting agent, an amine-based thermosetting agent, an imidazole-based thermosetting agent, an acid anhydride-based thermosetting agent, and an amide-based thermosetting agent. It is preferable that a sulfonium salt-based thermosetting agent may be further used in terms of implementing discoloration prevention and high hardness. These thermosetting agents may be used alone or as a mixture of two or more thereof. A content of the thermosetting agent is not particularly limited, and may be, for example, 5 to 30 parts by weight with respect to 100 parts by weight of the epoxy siloxane resin. When the content of the thermosetting agent is within the above range, curing efficiency of the composition for forming a hard coating layer is further improved, such that a hard coating layer having excellent hardness may be formed.

In an exemplary embodiment of the present invention, by using the composition for forming a hard coating layer, the base layer may be physically protected, the mechanical properties of the base layer may be further improved, and the dynamic bending properties of the window cover film may be further improved. In addition, adhesion with an anti-fingerprint layer to be described below and coatability may be further improved, such that a window cover film having uniform physical properties over the entire area of the film may be provided. Specifically, it is possible to provide a window cover film in which cracks do not occur even though a bending operation is repeated 30,000 times or more, more specifically 30,000 to 200,000 times, and most preferably 200,000 times or more, when evaluating the dynamic bending properties.

In addition, various epoxy compounds may be added to the hard coating layer of the present invention in addition to the above-described compounds of the formulas, as long as the characteristics of the present invention are achieved, but a content thereof is preferably less than 20 parts by weight with respect to 100 parts by weight of the compound of Formula 1, in terms of achieving the object of the present invention.

A polymerization method of the alicyclic epoxidized silsesquioxane-based compound according to the present invention is not limited as long as it is a known method, but, for example, the alicyclic epoxidized silsesquioxane-based compound may be prepared by hydrolysis and a condensation reaction between alkoxy silanes in the presence of water. The hydrolysis may accelerate a reaction by including a component such as an inorganic acid. In addition, the epoxy silane-based resin may be formed by polymerization of a silane compound having an epoxycyclohexyl group.

In an exemplary embodiment of the present invention, the hard coating layer may be formed by applying the above-described composition for forming a hard coating layer onto an upper surface or a lower surface of the base layer and curing the composition. The curing may be performed by thermal curing and/or photo curing, and may be performed by using a method known in the art.

In an exemplary embodiment of the present invention, a plurality of base layers and hard coating layers may be stacked. For example, each of the plurality of base layers and the plurality of hard coating layers may be alternately stacked. In addition, each hard coating layer may be disposed on each of both surfaces of the base layer.

<Anti-Fingerprint Layer>

According to an exemplary embodiment of the present invention, uniform physical properties may be exhibited over the entire area of the window cover film due to uniform physical properties between the anti-fingerprint layer formed on the hard coating layer and the hard coating layer. The same durability and touch feeling as those of glass may be imparted to the window cover film.

Specifically, a dynamic friction coefficient b measured at a load of 200 g, a force of 5 N, and a rate of 100 mm/min using a parchment paper as an object to be rubbed against the anti-fingerprint layer may be less than 0.15 or 0.1, and a ratio of a static friction coefficient a to the dynamic friction coefficient b may satisfy the following Expression 1.

$$0.5 \leq a/b \leq 1.5 \quad \text{[Expression 1]}$$

More specifically, the ratio (a/b) of the static friction coefficient a to the dynamic friction coefficient b may be 0.6 to 1.4, preferably 0.8 to 1.3, and more preferably 0.9 to 1.2. Within the above ranges, the same durability and surface strength as those of glass may be provided, and it is possible to allow a user to feel the same feeling of actually touching glass.

The anti-fingerprint layer may have a static friction coefficient of 0.2 or less, 0.15 or less, 0.12 or less, or 0.01 to 0.12. In addition, the anti-fingerprint layer may have a dynamic friction coefficient of 0.15 or less, 0.11 or less, or 0.01 to 0.1. Within the above ranges, the window cover film may have an excellent slip property and may exhibit the same feeling as that of glass, which is more preferable.

In order to impart such a touch feeling, the anti-fingerprint layer according to an exemplary embodiment of the present invention may be derived from a polyfunctional (meth)acrylate polymer, a polyfunctional urethane (meth)acrylate oligomer having 6 to 15 (meth)acrylic groups as a functional group, a polyfunctional (meth)acrylate monomer having 2 to 6 (meth)acrylic groups, and a fluorinated (meth)acrylate monomer. The term of the (meth)acrylic group may include both a methacrylate group and an acrylate group.

In addition, the anti-fingerprint layer may have a water contact angle of 105° or more, 108° or more, or 110 to 120°, and may have a sliding angle of 35° or less, 30° or less, or 15 to 25°. Within the above ranges, the window cover film may have an excellent slip property and may exhibit the same feeling as that of glass, which is more preferable.

The polyfunctional (meth)acrylate polymer may have, but is not limited to, a weight average molecular weight (Mw) of 10,000 to 30,000 g/mol and an acrylic equivalent of 100 to 1,000 g/eq. Within the above ranges, an occurrence of curl may be suppressed and an antifouling property may be improved by a curing reaction with a fluorine (meth)acrylate monomer, such that glass texture may be improved, which is more preferable. Preferably, commercially available products may be used, and examples thereof may include SMP-220A, SMP-250AP, SMP-360AP, and SMP-550AP (Kyoeisha Chemical Co., Ltd.) and 8KX-078 and 8KX-212 (TAISEI Fine Chem. Co., Ltd.), but are not limited thereto.

The polyfunctional urethane (meth)acrylate oligomer having 6 to 15 (meth)acrylic groups as a functional group forms a cured product with another curable monomer, such that hardness, adhesion with the hard coating layer, and a touch feeling may be further improved.

The polyfunctional urethane (meth)acrylate oligomer may be obtained through synthesis, but commercially available products may be preferably used. Examples of the commercially available product may include Miramer SC2152 and SC1020 (Miwon Specialty Chemical Co., Ltd.), Neorad P60 and P61 (DSM NeoResins, Inc.), UA-306I and UA-510H (Kyoeisha Chemical Co., Ltd.), and CN9013NS and CN9010NS (Sartomer Company Inc.), but are not limited thereto. A content of the polyfunctional urethane (meth)acrylate oligomer may be 10 to 90 parts by weight, and more preferably 50 to 80 parts by weight, with respect to 100 parts by weight of the polyfunctional (meth)acrylate polymer. Within the above composition ratio, all of the surface hardness, attachability, slip property, and flexibility of the present invention may be achieved, which is more preferable.

The polyfunctional (meth)acrylate monomer having 2 to 6 (meth)acrylic groups may be a curable monomer, and specific examples thereof may include polyfunctional acrylates such as dipentaerythritol hexa(meth)acrylate, dipentaerythritol penta(meth)acrylate, pentaerythritol tetra(meth)acrylate, ditrimethylolpropane tetra(meth)acrylate, trimethylolpropane tri(meth)acrylate, glycerol tri(meth)acrylate, tris(2-hydroxyethyl)isocyanurate tri(meth)acrylate, ethylene glycol di(meth)acrylate, propylene glycol (meth)acrylate, 1,3-butanedioldi(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, and hydroxyethyl(meth)acrylate. M340 (Miwon Specialty Chemical Co., Ltd.) or the like may be used as a commercially available product.

A content of the polyfunctional (meth)acrylate monomer may be 10 to 70 parts by weight, and more preferably 30 to 60 parts by weight, with respect to 100 parts by weight of the polyfunctional (meth)acrylate polymer. Within the above composition ratio, all of the surface hardness, attachability, slip property, and flexibility of the present invention may be achieved, which is more preferable.

The fluorinated (meth)acrylate monomer is not limited as long as it has a fluorine-substituted alkyl group, a fluorine-substituted alkyloxy group, and a fluorine-substituted polyalkylene glycol group. In addition, in an exemplary embodiment of the present invention, in a case where a compound having functional groups represented by the following Formula 4 and Formula 5 in order to more dramatically achieve the effects of the present invention, the anti-fingerprint property, the same touch feeling as that of glass, the slip property, and the surface hardness may be more excellent, which is more preferable. In particular, when a value of n in the following structural formulas is 10 or more and less than 30, more excellent effects may be achieved, which is very preferable.

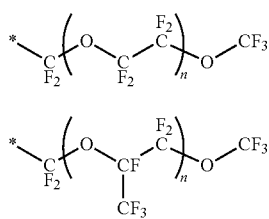

[Formula 4]

[Formula 5]

In Formula 4 and Formula 5, n is an integer of 3 to 30.

Each of the functional groups represented by Formula 4 and Formula 5 has a structure in which fluorines are concentrated in a molecule, such that a content of fluorine in a surface layer of the anti-fingerprint layer, that is, the outermost layer of the window cover film may be further increased. As a result, it is possible to provide a window cover film having an excellent antifouling property and water resistance. In addition, the slip property of the window cover film is excellent, such that it is possible to allow a user to feel the same feeling of actually touching glass.

In particular, when the value of n in Formula 4 and Formula 5 in the fluorine-substituted (meth)acrylate monomer is 10 to 30, the above-described effects are more significantly exhibited, which is more preferable.

It is preferable that a content of the fluorine-substituted (meth)acrylate monomer is 0.1 to 20 parts by weight, and more preferably 5 to 15 parts by weight, with respect to 100 parts by weight of the polyfunctional (meth)acrylate polymer, in terms of the same touch feeling as that of glass, the surface hardness, the antifouling property, and the water resistance. In addition, in this case, the slip property and the bending properties of the window cover film in which the layers are finally stacked are more excellent, which is more preferable, but the present invention is not thereto.

Specifically, as a commercially available fluorinated (meth)acrylate, RS75 (DIC Corporation), Optool DAC-HP (Daikin Industries, Ltd.), or the like may be used, but the present invention is not limited thereto.

Next, a method of forming the anti-fingerprint layer will be described in detail.

The anti-fingerprint layer may be obtained by applying and curing an anti-fingerprint composition including a polyfunctional (meth)acrylate polymer, a polyfunctional urethane (meth)acrylate oligomer having 6 to 15 (meth) acrylic groups as a functional group, a polyfunctional (meth)acrylate monomer having 2 to 6 (meth)acrylic groups, and a fluorinated (meth)acrylate monomer. More specifically, the anti-fingerprint composition may include a photoinitiator and a solvent.

The solvent is not limited as long as it dissolves resins used in the anti-fingerprint composition, but examples thereof may include benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidine, N-acetyl pyrrolidine, N-hydroxymethyl pyrrolidinone, N-butyl pyrrolidinone, N-ethyl pyrrolidinone, N-octyl pyrrolidinone, N-dodecyl pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, hexafluoroantimonate, monoalkyl ether of ethylene glycol, dialkyl ether of ethylene glycol, and derivatives (cellosolve) thereof. In addition, these solvents may be used alone or as a mixture of two or more thereof.

A content of the solvent is not limited, but may be 30 to 90 wt %, and more preferably 50 to 70 wt %, with respect to a total weight of the anti-fingerprint composition.

The photoinitiator is not limited as long as it is generally used in the polyfunctional (meth)acrylate resin, and specific examples thereof may include acetophenones, benzophenones, benzoins, propiophenones, benzyls, acylphosphic oxides, Michler's benzoyl benzoate, α-amyloxime ester, tetramethylfuran monosulfide, and thioxanthone. More specifically, benzophenone, 2-methyl-1-[4-(methylthio)phenyl] 2-morpholinepropan-1-one, diphenyl ketone benzyl dimethyl ketal, 2-hydroxy-2-methyl-1-phenyl-1-one, 4-hydroxycyclophenylketone, dimethoxy-2-phenylacetophenone, anthraquinone, fluorene, triphenylamine, carbazole, 3-methylacetophenone, 4-chloroacetophenone, 4,4-dimethoxyacetophenone, 4,4-diaminobenzophenone, and 1-hydroxycyclohexylphenylketone may be used as the photoinitiator, but the present invention is not limited thereto.

In addition, the anti-fingerprint composition may further include inorganic particles, if necessary. The anti-fingerprint composition includes the inorganic particles, such that the slip property and abrasion resistance may be further improved.

One or a mixture selected from silica and alumina having an average particle diameter of 50 nm or less may be used as the inorganic particle. Within the above average particle diameter, the particle may have excellent dispersibility and an excellent slip property, and may be suitable for satisfying the physical property in which the ratio of the static friction coefficient a to the dynamic friction coefficient b according to Expression 1 of the present invention is 0.5 to 1.5, which is preferable.

An inorganic particle whose surface is treated may be used to increase dispersibility. A content of the inorganic particle is not limited, but the content of the inorganic particle in a composition (content of a solid content) except for the solvent may be 0.1 to 5 wt %, and more specifically, 1 to 3 wt %.

By using the anti-fingerprint composition in the present invention, as described above, it is possible to allow a user to feel the same feeling of actually touching glass, and a window cover film having an excellent durability and curl suppression property may be provided. The "curl suppression property" may mean that a degree of curl is significantly low. The degree of curl may refer to a vertical height from the lowest point (for example, the center) of a window cover film to a vertex of a sample obtained by cutting the window cover film into a square with 10 cm sides, the window cover film being inclined at an angle of 45° in an MD direction.

In the present invention, the MD direction is a machine direction, and may refer to a direction in which the film is moved along an automatic machine when the film is stretched or stacked in an automatic process. The curl of the sample inclined at the angle of 45° in the MD direction is measured, such that the curl at each vertex means a curl in the MD direction and a direction vertical to the MD direction. Therefore, the curls may be distinguished in each direction. In some exemplary embodiments, the degree of curl of the window cover film may be 5 mm or less.

<Flexible Display Panel>

In an exemplary embodiment of the present invention, a flexible display panel or flexible display device that includes the window cover film according to an exemplary embodiment may be provided.

In this case, the window cover film may be used as the outermost window substrate of the flexible display device. The flexible display device may be various image display devices such as a general liquid crystal display device, an electro-luminescence display device, a plasma display device, and a field emission display device.

Hereinafter, the present invention will be described in more detail on the basis of examples and comparative examples. However, the following examples and comparative examples are only examples for describing the present invention in more detail, and the present invention is not limited by the examples and comparative examples.

1) Friction Coefficient

A film was cut out according to ASTM D1894 into a width of 50 mm and a length of 150 mm and fixed to a Friction Tester (TR-2, Toyo Seiki Seisaku-sho, Ltd.), a parchment paper was used as an object to be rubbed, and a distance of 100 mm was measured at a load of 200 g, a force of 5 N, and a rate of 100 mm/min.

2) Touch Feeling

A degree in which a user feels the same feeling of actually touching glass when a surface of the produced window cover film was rubbed with hands was evaluated for 30 users on a scale of 10 points. An average value was calculated by converting the total point obtained from the 30 users.

3) Weight Average Molecular Weight

<Weight Average Molecular Weight of Film>

A weight average molecular weight of the film was measured by dissolving the film in a DMAc eluent containing 0.05 M LiBr. Waters GPC system, Waters 1515 isocratic HPLC Pump, and Waters 2414 Refractive Index detector were used as GPC, an Olexis, a Polypore, and a mixed D column were connected to each other and used as a column, polymethyl methacrylate (PMMA STD) was used as a standard material, and the analysis was performed at 35° C. and a flow rate of 1 mL/min.

<Weight Average Molecular Weight of Silsesquioxane Resin>

In the measurement of a weight average molecular weight of a silsesquioxane resin, GPC (Waters GPC system, Waters 1515 isocratic HPLC Pump, Waters 2414 Refractive Index detector) was used, four Shodexs KF-801, 802.5, 803, and 805 (Waters Corporation) that were connected to each other in series were used as a GPC column, THF was used as a solvent, and a rate was 1 mL/min.

4) Modulus/Break Elongation

A modulus and a break elongation were measured under a condition in which the polyamide-imide film having a length of 50 mm and a width of 10 mm was pulled according to ASTM D882 at 25° C. and 50 mm/min using the UTM 3365 (Instron Corporation).

A thickness of the film was measured, and data of a value thereof was input to the device. A unit of the modulus is GPa, and a unit of the break elongation is %.

5) Light Transmittance

For the film having a thickness of 50 μm, a total light transmittance measured in the entire wavelength region of 400 to 700 nm and a single wavelength light transmittance measured at 338 nm were measured according to ASTM D1746 using a spectrophotometer (COH-400, Nippon Denshoku Industries Co., Ltd.) and a UV/Vis (UV3600, Shimadzu Corporation), respectively. A unit of the light transmittance is %.

6) Haze

A haze of the film having a thickness of 50 μm was measured according to ASTM D1003 using the spectrophotometer (COH-400, Nippon Denshoku Industries Co., Ltd.). A unit of the haze is %.

7) Yellow Index (YI) and b* Value

A yellow index and a b* value of the film having a thickness of 50 μm were measured according to ASTM E313 using a colorimeter (ColorQuest XE, Hunter Associates Laboratory, Inc.).

8) Water Contact Angle

A water contact angle was measured according to ASTM D5946 using a water contact angle meter (DSA, KRUSS GmbH).

9) Sliding Angle

When a gas diffusion electrode substrate was horizontally placed so that a surface of the gas diffusion electrode substrate that is opposite to a surface on which a microporous layer is formed faced upward, 10 μL of purified water was put on the surface, and the substrate was inclined at a rate of 1 degree/sec, an angle at which the purified water started to roll was measured using a contact angle meter (DM-501, Kyowa Electronic Instruments Co., Ltd.). The measurement was performed 8 times while changing the position, and an average thereof was used.

10) Pencil Hardness 20 mm of a line was drawn on the film according to JIS K5400 at a load of 750 g and a rate of 50 mm/sec, and the drawing of the line was repeated 5 times or more, to measure a pencil hardness on the basis of a generation of 2 or more scratches.

PRODUCTION EXAMPLE 1

Production of Base Layer

Terephthaloyl dichloride (TPC) and 2,2'-bis(trifluoromethyl)-benzidine (TFMB) were put into a solution in which dichloromethane and pyridine were mixed with each other and the mixture was stirred in a reactor under a nitrogen atmosphere at 25° C. for 2 hours. In this case, a molar ratio of TPC:TFMB was set to 300:400, and a content of a solid content was adjusted to 10 wt %. Thereafter, the reactant was precipitated in an excess amount of methanol and then filtered, and the obtained solid content was vacuum-dried at 50° C. for 6 hours or longer to obtain an oligomer. A formula weight (FW) of the produced oligomer was 1,670 g/mol.

N,N-dimethylacetamide (DMAc) as a solvent, 100 moles of the oligomer, and 28.6 moles of 2,2'-bis(trifluoromethyl)-benzidine (TFMB) were injected into the reactor and sufficiently stirred.

After confirming that the solid raw material was completely dissolved, fumed silica (surface area: 95 m²/g, <1 µm) was added to DMAc in an amount of 1,000 ppm with respect to the solid content, and the fumed silica was dispersed using ultrasonic waves and then injected into the reactor. 64.3 moles of cyclobutanetetracarboxylic dianhydride (CBDA) and 64.3 moles of 4,4'-hexafluoroisopropylidene diphthalic anhydride (6FDA) were sequentially injected into the reactor and sufficiently stirred, and then polymerization was performed at 40° C. for 10 hours. At this time, a content of the solid content was 20 wt %. Subsequently, each of pyridine and acetic anhydride was sequentially added to the solution in an amount of 2.5 moles times a total content of dianhydride, and the mixture was stirred at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining polyamide-imide powder. The powder was diluted and dissolved with DMAc at 20% to prepare a composition for forming a base layer.

The composition for forming a base layer was applied onto a polyethylene terephthalate (PET) base film using an applicator, dried at 80° C. for 30 minutes and 100° C. for 1 hour, and cooled at room temperature, thereby producing a film. Thereafter, the film was subjected to a stepwise heat treatment at 100 to 200° C. and 250 to 300° C. for 2 hours and a heating rate of 20° C./min.

The produced polyamide-imide film had a thickness of 50 µm, a transmittance at 388 nm of 15%, a total light transmittance of 89.73%, a haze of 0.4%, a yellow index (YI) of 1.9, a b* value of 1.0, a modulus of 6.5 GPa, a break elongation of 21.2%, a weight average molecular weight of 310,000 g/mol, a polydispersity index (PDI) of 2.11, and a pencil hardness of HB/750 g.

PREPARATION EXAMPLE 2

Preparation of Composition for Forming Hard Coating Layer 2-(3,4-epoxycyclohexyl)ethyltrimethoxysilane (ECTMS, Tokyo chemical industry Co., Ltd.) and water were mixed with each other at a ratio of 24.64 g:2.70 g (0.1 mol:0.15 mol) to prepare a reaction solution, and the reaction solution was placed into a 250 mL 2-neck flask. 0.1 mL of tetramethylammonium hydroxide (Aldrich Corporation) as a catalyst and 100 mL of tetrahydrofuran (Aldrich Corporation) were added to the mixture and stirred at 25° C. for 36 hours. Thereafter, layer separation was performed, a product layer was extracted with methylene chloride (Aldrich Corporation), moisture was removed from extract with magnesium sulfate (Aldrich Corporation), and the solvent was vacuum-dried, thereby obtaining an epoxy siloxane-based resin. A weight average molecular weight of the epoxy siloxane-based resin was measured using gel permeation chromatography (GPC), and the measured weight average molecular weight was 2,500 g/mol.

A composition was prepared by mixing 30 g of the prepared epoxy siloxane-based resin, 10 g of (3',4'-epoxycyclohexyl)methyl 3,4-epoxycyclohexanecarboxylate and 5 g of bis[(3,4-epoxycyclohexyl)methyl]adipate as a cross-linking agent, 0.5 g of (4-methylphenyl)[4-(2-methylpropyl)phenyl]iodoniumhexafluorophosphate as a photoinitiator, and 54.5 g of methyl ethyl ketone with each other.

PREPARATION EXAMPLE 3

Preparation of Anti-Fingerprint Composition for Forming Anti-Fingerprint Layer 75 parts by weight of a 15-functional urethane acrylate oligomer (Miramer SC2152, Miwon Specialty Chemical Co., Ltd.), 50 parts by weight of pentaerythritol tri/tetraacrylate (M340, Miwon Specialty Chemical Co., Ltd.), 10 parts by weight of fluorine-substituted acrylate (RS75, DIC corporation), 15 parts by weight of 1-hydroxy-cyclohexyl-phenyl-ketone (Omnirad 184, IGM Resins) as a photoinitiator, and 250 parts by weight of methyl ethyl ketone, with respect to 100 parts by weight of a polyfunctional (meth)acrylate polymer (SMP-250AP, Kyoeisha Chemical Co., Ltd.), were stirred for 1 hour, and the mixture was filtered by a 0.2 µm PP Cartridge Filter, thereby preparing an anti-fingerprint composition for an AF layer.

PREPARATION EXAMPLE 4

Preparation of Anti-Fingerprint Composition for Forming Anti-Fingerprint Layer 75 parts by weight of 10-functional urethane acrylate (SC1020, Miwon Specialty Chemical Co., Ltd.), 50 parts by weight of pentaerythritol tri/tetraacrylate (M340, Miwon Specialty Chemical Co., Ltd.), 5 parts by weight of fluorine acrylate (RS75, DIC corporation), 15 parts by weight of 1-hydroxy-cyclohexyl-phenyl-ketone (Omnirad 184, IGM Resins) as a photoinitiator, and 255 parts by weight of methyl ethyl ketone, with respect to 100 parts by weight of a polyfunctional (meth)acrylate polymer (SMP-250AP, Kyoeisha Chemical Co., Ltd.), were stirred for 1 hour, and the mixture was filtered by a 0.2 µm PP Cartridge Filter, thereby preparing an anti-fingerprint composition for an AF layer.

PREPARATION EXAMPLE 5

Preparation of Anti-Fingerprint Composition for Forming Anti-Fingerprint Layer 75 parts by weight of 10-functional urethane acrylate (SC1020, Miwon Specialty Chemical Co., Ltd.), 50 parts by weight of pentaerythritol tri/tetraacrylate (M340, Miwon Specialty Chemical Co., Ltd.), 10 parts by weight of fluorine acrylate (Optool DAC-HP, Daikin Industries, Ltd.), 15 parts by weight of 1-hydroxy-cyclohexyl-phenyl-ketone (Omnirad 184, IGM Resins) as a photoinitiator, and 250 parts by weight of methyl ethyl ketone, with respect to 100 parts by weight of a polyfunctional (meth)acrylate polymer (SMP-250AP, Kyoeisha Chemical Co., Ltd.), were stirred for 1 hour, and the mixture was filtered by a 0.2 µm PP Cartridge Filter, thereby preparing an anti-fingerprint composition for an AF layer.

PREPARATION EXAMPLE 6

Preparation of Anti-Fingerprint Composition for Forming Anti-Fingerprint Layer 75 parts by weight of 10-functional urethane acrylate (SC1020, Miwon Specialty Chemical Co., Ltd.), 50 parts by weight of pentaerythritol tri/tetraacrylate (M340, Miwon Specialty Chemical Co., Ltd.), 5 parts by weight of fluorine acrylate (Optool DAC-HP, Daikin Industries, Ltd.), 15 parts by weight of 1-hydroxy-cyclohexyl-phenyl-ketone (Omnirad 184, IGM Resins) as a photoinitiator, and 255 parts by weight of methyl ethyl ketone, with respect to 100 parts by weight of a polyfunctional (meth)acrylate polymer (SMP-250AP, Kyoeisha Chemical Co., Ltd.), were stirred for 1 hour, and the mixture was filtered by a 0.2 μm PP Cartridge Filter, thereby preparing an anti-fingerprint composition for an AF layer.

PREPARATION EXAMPLE 7

Preparation of Anti-Fingerprint Composition for Forming Anti-Fingerprint Layer 75 parts by weight of 10-functional urethane acrylate (SC1020, Miwon Specialty Chemical Co., Ltd.), 50 parts by weight of pentaerythritol tri/tetraacrylate (M340, Miwon Specialty Chemical Co., Ltd.), 10 parts by weight of silicone acrylate (BYK3570, BYK Additives & Instruments), 15 parts by weight of 1-hydroxy-cyclohexyl-phenyl-ketone (Omnirad 184, IGM Resins) as a photoinitiator, and 250 parts by weight of methyl ethyl ketone, with respect to 100 parts by weight of a polyfunctional (meth)acrylate polymer (SMP-250AP, Kyoeisha Chemical Co., Ltd.), were stirred for 1 hour, and the mixture was filtered by a 0.2 μm PP Cartridge Filter, thereby preparing an anti-fingerprint composition for an AF layer.

EXAMPLE 1

The composition for forming a hard coating layer prepared in Preparation Example 2 was applied onto one surface of the polyimide film having the thickness of 50 μm produced in Production Example 1 using a meyer bar, and the composition was cured at 60° C. for 5 minutes, irradiated with UV at 1 J/cm² using a high-pressure metal lamp, and thermally cured at 120° C. for 15 minutes, thereby forming a hard coating layer having a thickness of 10 μm.

Thereafter, the anti-fingerprint composition prepared in Preparation Example 3 was applied onto the hard coating layer using a meyer bar, and the anti-fingerprint composition was cured at 60° C. for 5 minutes and irradiated with UV at 1 J/cm² using a high-pressure metal lamp, thereby producing a window cover film on which an anti-fingerprint layer having a thickness of 3 μm is formed. The physical properties of the produced window cover film were measured. The results are shown in Table 1.

EXAMPLE 2

A window cover film was produced in the same manner as that of Example 1 except that an anti-fingerprint layer was used by using the anti-fingerprint composition prepared in Preparation Example 4 as an anti-fingerprint composition. The physical properties of the produced window cover film were measured. The results are shown in Table 1.

EXAMPLE 3

A window cover film was produced in the same manner as that of Example 1 except that the anti-fingerprint composition prepared in Preparation Example 5 was used as an anti-fingerprint composition. The physical properties of the produced window cover film were measured. The results are shown in Table 1.

EXAMPLE 4

A window cover film was produced in the same manner as that of Example 1 except that the anti-fingerprint composition prepared in Preparation Example 6 was used as an anti-fingerprint composition. The physical properties of the produced window cover film were measured. The results are shown in Table 1.

COMPARATIVE EXAMPLE 1

A window cover film was produced in the same manner as that of Example 1 except that the anti-fingerprint composition prepared in Preparation Example 7 was used as an anti-fingerprint composition. The physical properties of the produced window cover film were measured. The results are shown in Table 1.

COMPARATIVE EXAMPLE 2

A window cover film was produced in the same manner as that of Example 1 except that only a hard coating layer was formed and an anti-fingerprint layer was not formed. In addition, the friction coefficient and touch feeling of the hard coating layer were measured. The results are shown in Table 1.

TABLE 1

|  | Example 1 | Example 2 | Example 3 | Example 4 | Comparative Example 1 | Comparative Example 2 |
|---|---|---|---|---|---|---|
| Water contact angle (°) | 114 | 113 | 113 | 112 | 102 | 89 |
| Sliding angle (°) | 20 | 21 | 21 | 23 | 40 | 45 |
| Static friction coefficient (a) | 0.08 | 0.12 | 0.11 | 0.09 | 0.22 | 0.3 |
| Dynamic friction coefficient (b) | 0.08 | 0.1 | 0.1 | 0.09 | 0.45 | 0.18 |
| a/b | 1 | 1.2 | 1.1 | 1 | 0.49 | 1.67 |
| Touch feeling | 10 | 8 | 10 | 9 | 5 | 2 |

As set forth above, the window cover film according to an exemplary embodiment of the present invention has the same touch feeling as that of glass together with an anti-fingerprint (AF) property, an excellent slip property, high surface hardness, flexibility, and excellent bending properties.

Further, although a predetermined deformation occurs repeatedly, the hard coating layer and the window cover film may be restored to the original form without substantially semi-permanent deformation and/or damage. Therefore, a window cover film applicable to a display device or foldable device which has a curved shape may be provided.

Further, according to the window cover film according to an exemplary embodiment of the present invention, a window cover film having an excellent antifouling property and abrasion resistance which is different from that in the related art may be provided.

The window cover film according to an exemplary embodiment of the present invention may have further improved flexibility and mechanical strength by adjusting the thickness of each of the base layer, the hard coating layer, and the anti-fingerprint layer at a predetermined ratio.

The base layer of the window cover film according to an exemplary embodiment of the present invention is formed of a polyimide-based resin. In the present invention, the term "the polyimide-based resin" includes both polyimide and polyamide-imide. In a case where the base layer is formed of a polyamide block polyamide-imide resin, more excellent optical properties and mechanical properties (for example, elongation) may be secured, which is preferable.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A window cover film comprising sequentially stacked layers which are a base layer, a hard coating layer, and an anti-fingerprint layer, the base layer being formed of a polyamide-imide (PAI)-based resin, the hard coating layer comprises a silsesquioxane-based compound, and the anti-fingerprint layer being derived from a polyfunctional (meth) acrylate polymer, a polyfunctional urethane (meth)acrylate oligomer having 6 to 15 (meth)acrylic groups as a functional group, a polyfunctional (meth)acrylate monomer having 2 to 6 (meth)acrylic groups, and a fluorinated (meth)acrylate monomer, wherein the window cover film has a dynamic friction coefficient b of less than 0.15 as measured at a load of 200 g, a force of 5 N, and a rate of 100 mm/min using a parchment paper as an object to be rubbed, and a ratio of a static friction coefficient a to the dynamic friction coefficient b satisfies the following Expression 1, $$0.5 \leq a/b \leq 1.5. \qquad \text{[Expression 1]}$$

2. The window cover film of claim 1, wherein the window cover film has a static friction coefficient of 0.2 or less.

3. The window cover film of claim 1, wherein the window cover film has a dynamic friction coefficient of 0.1 or less.

4. The window cover film of claim 1, wherein the anti-fingerprint layer has a water contact angle of 105° or more.

5. The window cover film of claim 1, wherein the anti-fingerprint layer has a sliding angle of 35° or less.

6. The window cover film of claim 1, wherein a weight average molecular weight of the fluorinated (meth)acrylate monomer is 1,500 to 5,000 g/mol.

7. The window cover film of claim 1, wherein the anti-fingerprint layer further includes inorganic particles.

8. The window cover film of claim 7, wherein an average particle diameter of the inorganic particles is 50 nm or less.

9. The window cover film of claim 7, wherein the inorganic particles are one or a mixture selected from silica and alumina.

10. The window cover film of claim 1, wherein the base layer has a modulus measured according to ASTM D882 of 3 GPa or more, a break elongation measured according to ASTM D882 of 8% or more, a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

11. The window cover film of claim 1, wherein the base layer includes a unit derived from fluorine-based aromatic diamine, a unit derived from aromatic dianhydride, a unit derived from alicyclic dianhydride, and a unit derived from aromatic diacid dichloride.

12. The window cover film of claim 1, wherein a thickness of the base layer is 10 to 500 μm, a thickness of the hard coating layer is 1 to 50 μm, and a thickness of the anti-fingerprint layer is 0.01 to 10 μm.

13. The window cover film of claim 1, wherein a pencil hardness of the hard coating layer is 4H or higher.

14. A flexible display panel comprising the window cover film of claim 1.

* * * * *